United States Patent
Thompson et al.

(10) Patent No.: US 11,731,330 B2
(45) Date of Patent: Aug. 22, 2023

(54) MOLTEN PLASTIC DELIVERY SYSTEM WITH PUSH-PULL CABLE ACTUATION

(71) Applicant: MOLD-MASTERS (2007) LIMITED, Georgetown (CA)

(72) Inventors: Jeffrey Scott Thompson, Burlington (CA); Karsten Stengeli, Guelph (CA); Haiqian Lu, Mississauga (CA); Robert Rinaldi, Brampton (CA)

(73) Assignee: MOLD-MASTERS (2007) LIMITED, Georgetown (CA)

( * ) Notice: Subject to any disclaimer, the term of this patent is extended or adjusted under 35 U.S.C. 154(b) by 71 days.

(21) Appl. No.: 17/224,471

(22) Filed: Apr. 7, 2021

(65) Prior Publication Data
US 2021/0316486 A1    Oct. 14, 2021

Related U.S. Application Data

(60) Provisional application No. 63/006,964, filed on Apr. 8, 2020.

(51) Int. Cl.
*B29C 45/28* (2006.01)

(52) U.S. Cl.
CPC .... *B29C 45/281* (2013.01); *B29C 2045/2813* (2013.01); *B29C 2045/2831* (2013.01)

(58) Field of Classification Search
CPC ... B29C 45/28; B29C 45/281; B29C 45/2806; B29C 2045/2813; B29C 2045/2831
See application file for complete search history.

(56) References Cited

U.S. PATENT DOCUMENTS

| | | | | |
|---|---|---|---|---|
| 3,245,122 A | * | 4/1966 | Mauer | B29C 45/50 425/593 |
| 3,292,214 A | * | 12/1966 | Battenfeld | B29C 45/70 425/594 |
| 3,354,507 A | * | 11/1967 | Orrevad | B29C 45/234 137/538 |

(Continued)

FOREIGN PATENT DOCUMENTS

| | | |
|---|---|---|
| CN | 107263814 A | 10/2017 |
| CN | 107538688 A | 1/2018 |

(Continued)

OTHER PUBLICATIONS

Machine Translation of CN107538688A from Google Patents, https://patents.google.com/patent/CN107538688A/en?oq=cn107538688, 7 pages. (Year: 2022).*

*Primary Examiner* — Emmanuel S Luk
(74) *Attorney, Agent, or Firm* — Dinsmore & Shohl LLP

(57) ABSTRACT

A molten plastic delivery system is disclosed having a nozzle defining a nozzle channel with a downstream nozzle channel opening. A valve pin is reciprocable within the nozzle channel between a closed position and an open position. The system includes a bell crank having first and second arms that are connected at and rotatable about a pivot. The first arm is coupled to the valve pin and the second arm is coupled to a push-pull cable such that angularly pushing the second arm about the pivot via the push-pull cable moves the valve pin to the open position and angularly pulling the second arm about the pivot via the push-pull cable moves the valve pin to the closed position.

15 Claims, 15 Drawing Sheets

(56) References Cited

U.S. PATENT DOCUMENTS

| | | | | |
|---|---|---|---|---|
| 3,398,435 | A * | 8/1968 | Nouel | B29C 45/544 |
| | | | | 425/193 |
| 3,731,874 | A * | 5/1973 | Fowlie | G06M 3/02 |
| | | | | 399/80 |
| 3,910,744 | A * | 10/1975 | Ronden | B29C 57/02 |
| | | | | 425/384 |
| 4,439,127 | A * | 3/1984 | Frohn | B29C 49/32 |
| | | | | 425/161 |
| 4,449,915 | A | 5/1984 | van den Brink | |
| 4,545,753 | A * | 10/1985 | Hehl | B29C 45/1742 |
| | | | | 425/436 R |
| 6,294,122 | B1 | 9/2001 | Moss et al. | |
| 6,431,851 | B1 * | 8/2002 | Ellinger | B30B 15/047 |
| | | | | 425/589 |
| 7,918,660 | B2 * | 4/2011 | Babin | B29C 45/281 |
| | | | | 425/151 |
| 2003/0057607 | A1 | 3/2003 | Babin | |
| 2004/0232604 | A1 * | 11/2004 | Jordan | B29C 45/1704 |
| | | | | 264/572 |
| 2009/0071943 | A1 * | 3/2009 | Kilibarda | B23K 11/314 |
| | | | | 219/86.25 |
| 2016/0107352 | A1 * | 4/2016 | Bazzo | B29C 45/231 |
| | | | | 425/564 |
| 2019/0358878 | A1 * | 11/2019 | Lee | B29C 45/281 |
| 2020/0001522 | A1 * | 1/2020 | Manuel | B29C 64/218 |
| 2021/0129400 | A1 | 5/2021 | Hansen et al. | |

FOREIGN PATENT DOCUMENTS

| | | |
|---|---|---|
| CN | 108312441 A | 7/2018 |
| CN | 210211226 U | 3/2020 |
| DE | 19532978 A1 | 3/1997 |
| EP | 3009251 A1 | 4/2016 |
| GB | 1118692 A | 7/1968 |
| JP | 59186564 U | 12/1981 |
| JP | 6449782 U | 3/1989 |
| JP | 2004209955 A | 7/2004 |
| WO | 9627489 A1 | 9/1996 |
| WO | 2018083068 A1 | 5/2018 |

* cited by examiner

MOLTEN PLASTIC DELIVERY SYSTEM WITH PUSH-PULL CABLE ACTUATION

CROSS-REFERENCE TO RELATED APPLICATIONS

This application claims the benefit of U.S. Application No. 63/006,964, filed Apr. 8, 2020, which is incorporated by referenced herein in its entirety.

FIELD

The application relates generally to a molten plastic delivery system, and in particular, to a molten plastic delivery system with push-pull cable actuation.

BACKGROUND

Plastic injection molding uses an injection screw to plasticize plastic pellets into molten plastic and advances the injection screw to urge the molten plastic into a cavity shaped to mold a plastic article. Some plastic injection molding apparatuses reciprocate a valve pin inside a nozzle channel between a closed position to prevent the molten plastic from exiting the nozzle channel and an open position to allow the molten plastic to exit the nozzle channel. An actuator is mounted upstream of the nozzle within the mold assembly to reciprocate the valve pin. Because the spacing in the injection molding apparatus to accommodate the mold assembly is limited, minimizing the height of the mold assembly is desirable.

BRIEF SUMMARY

An aspect of the present application provides a molten plastic delivery system comprising: a plurality of plates; a manifold defining a network of channels for conveying a molten plastic from a manifold inlet to a manifold outlet, the manifold is housed in the plurality of plates; a nozzle defining a nozzle channel having an upstream nozzle channel opening and a downstream nozzle channel opening, the upstream nozzle channel opening is in fluid communication with the manifold outlet; a valve pin is received in the nozzle channel and reciprocable within the nozzle channel between a closed position to prevent the molten plastic from passing through the downstream nozzle channel opening and an open position to allow the molten plastic to pass through the downstream nozzle channel opening; a bell crank having a first and second arms that are connected at and rotatable about a pivot, the first arm is coupled to the valve pin; a push-pull cable is coupled to the second arm such that angularly pushing the second arm via the push-pull cable moves the valve pin to the open position and angularly pulling the second arm via the push-pull cable moves the valve pin to the closed position.

The molten plastic delivery system can comprise a push-pull cable coupler and a valve pin coupler, the push-pull cable coupler including a first and second ends, the valve pin coupler including a third and fourth ends, the push-pull cable including an output end, the first end is coupled to the second arm and the second end is coupled to the output end, the third end is coupled to the first arm, and both the second end and the fourth end are pointing in substantially the same angular direction about the pivot.

The plurality of plates can include a motion redirector assembly plate positioned upstream of the manifold, the molten plastic delivery system can comprise a motion redirector assembly having a first and second members and the bell crank are housed in a spacing between the first and second members, the bell crank is coupled to the first member at the pivot.

The molten plastic delivery system can comprise a bracket mounted to an exterior surface of the motion redirector assembly plate, the bracket supporting the output end coupled to the second end of the push-pull cable coupler.

The motion redirector assembly can include a pin coupling the push-pull cable coupler to the second arm, the pin having a first end portion and a second end portion. The push-pull cable coupler can include an extender and a head at the first end of the push-pull cable coupler, the extender releasably connecting the head to the output end of the push-pull cable, the head defining a bore housing the first end portion, and the second arm defining a bore housing the second end portion.

The motion redirector assembly can include an another pin, the second member includes a first and second slots, the first slot to linearly guide the another pin coupling the valve pin to the first arm, the second slot to linearly guide the pin coupling the push-pull cable to the second arm.

The molten plastic delivery system can comprise a valve pin coupler coupling the valve pin to the first arm of the bell crank, the valve pin coupler defining a bore having a rounded rectangle cross-section housing the another pin, the another pin is radially slidable within the bore of the valve pin coupler and the valve pin coupler is rotatable around the another pin.

The molten plastic delivery system can comprise a radial bearing positioned in between the another pin and an inner wall of the valve pin coupler.

The molten plastic delivery system can comprise a detent pin releasably connecting the head to the extender.

The molten plastic delivery system can comprise an another detent pin releasably connecting the extender to the output end of the push-pull cable.

The bell crank can include a protrusion at the pivot received in a bore of the first member of the motion redirector assembly.

The molten plastic delivery system can include a radial bearing positioned in between the protrusion and an inner wall of the bore of the first member of the motion redirector assembly.

The motion redirector assembly can include a screw having a first and second end portions, the first end portion forming the protrusion and the second end portion is threadably connected to the first member of the motion redirector assembly.

The protrusion is integral with the first member of the motion redirector assembly.

The molten plastic delivery system can comprise a linear actuator coupled to an input-end of the push-pull cable.

The first member and the second member can form a unitary body.

The motion redirector assembly can include a base from which the first member and the second member can project.

The base can define a bore, the bore can be a through bore, through which the valve pin coupler can extend.

The motion redirector assembly can further include a bushing received in the through bore and positioned between an inner surface of the bore and the valve pin coupler.

The motion redirector assembly can further include a linking member coupling the third end to the first arm.

The motion redirector assembly can further include a dowel coupling the linking member to the first arm.

The motion redirector assembly can further include an another dowel coupling the first end to the second arm.

The motion redirector assembly can further include a first pin and a second pin positioned to limit the angular movement about the pivot of the bell crank between the first pin and a second pin.

BRIEF DESCRIPTION OF THE DRAWINGS

The drawings are not to scale.

DETAILED DESCRIPTION

Specific embodiments of the present application are now described with reference to the figures. The following detailed description is merely exemplary in nature and is not intended to limit the concepts and uses of the concepts. Furthermore, there is no intention to be restricted by any expressed or implied theory in the present application. In the description, "downstream" is used with reference to the direction of the molten plastic flow from an injector to a mold cavity, and also with reference to the order of components, or features thereof, through which the molten plastic flows from the injector to the mold cavity, whereas "upstream" is used with reference to the opposite direction. Depending on context, upstream and downstream can be used as relative or absolute terms.

Figure 1:
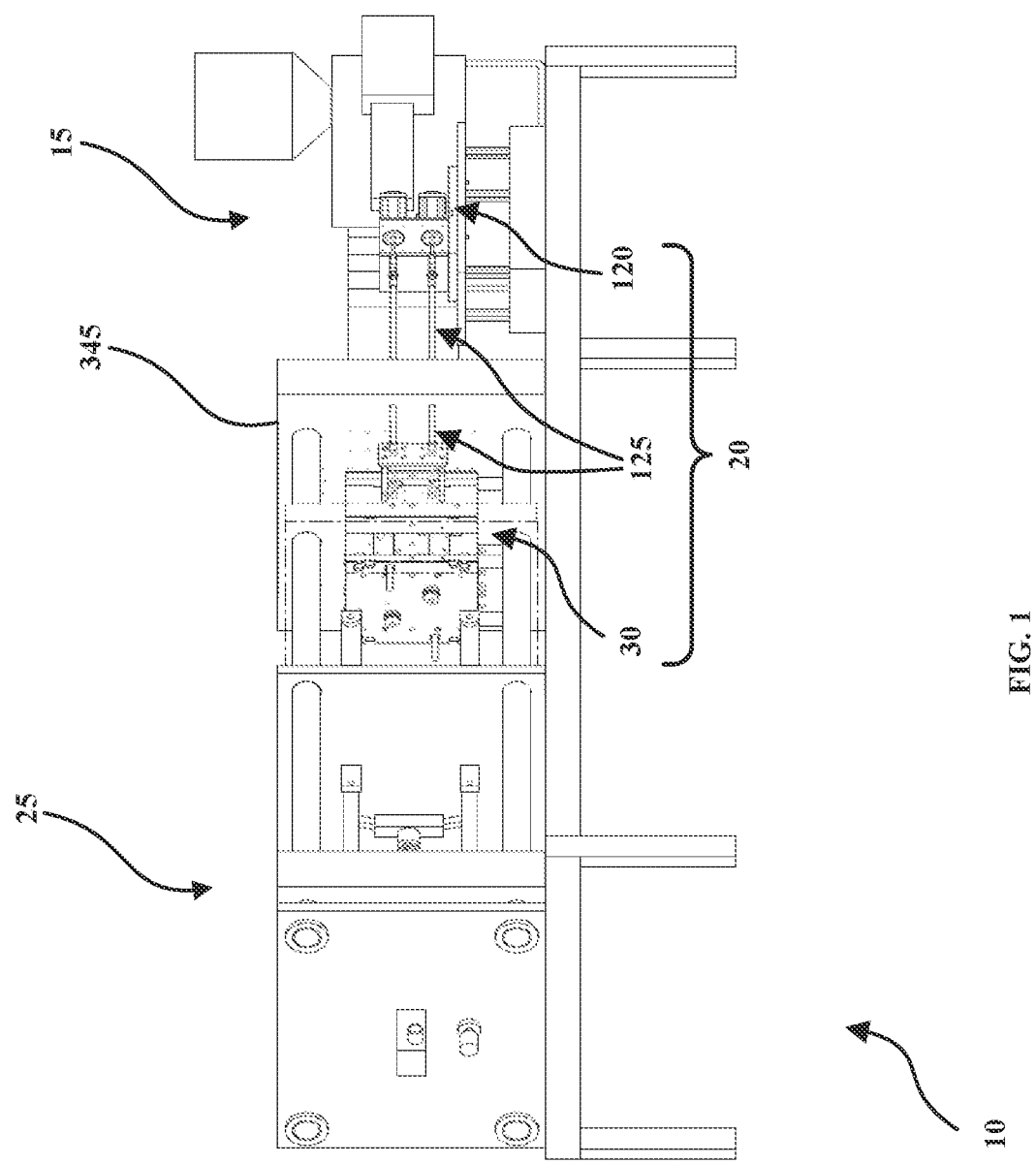
FIG. 1 is a perspective view of an injection molding apparatus in accordance with an embodiment of the present application.
Figure 2:
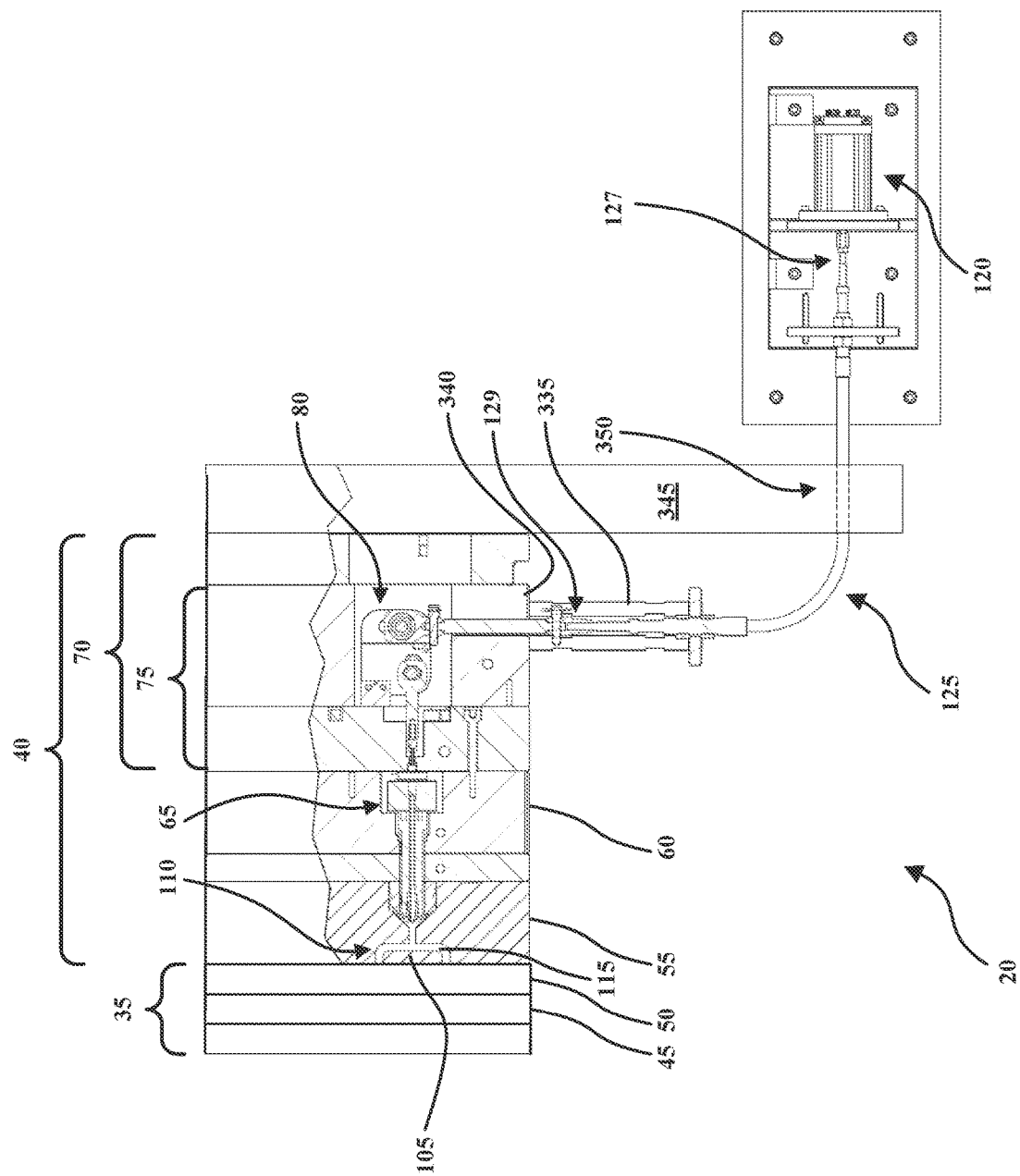
FIG. 2 is a partial cutaway top view of a molten plastic delivery system of FIG. 1.

FIG. 1 is a perspective view of an injection molding apparatus 10 including an injection unit 15, a molten plastic delivery system 20, and a clamping unit 25. Molten plastic delivery system 20 includes a mold assembly 30. Referring to FIG. 2, mold assembly 30 includes a moving half 35 and a stationary half 40. Clamping unit 25 is configured to move moving half 35 towards stationary half 40 to close mold assembly 30 and away from stationary half 40 to open mold assembly 30. Moving half 35 includes a core plate 45 and a stripper plate 50. Stationary half 40 includes a cavity plate 55, a manifold plate 60 housing a manifold 65, and, depending on the application of injection molding apparatus 10, other plates 70 for housing other components of mold assembly 30. In the embodiments of the present application, other plates 70 include a motion redirector assembly plate 75 housing motion redirector assemblies 80 (referenced, in the present application, individually as motion redirector assembly 80, and collectively as motion redirector assemblies 80) (see FIGS. 3 and 4). Motion redirector assembly plate 75 is located upstream of manifold 65. In the illustrated embodiment, two motion redirector assemblies 80 are shown, but persons of relevant ordinary skill in the art would appreciate that injection molding apparatus 10 can have one or more motion redirector assemblies 80.

Figure 4:
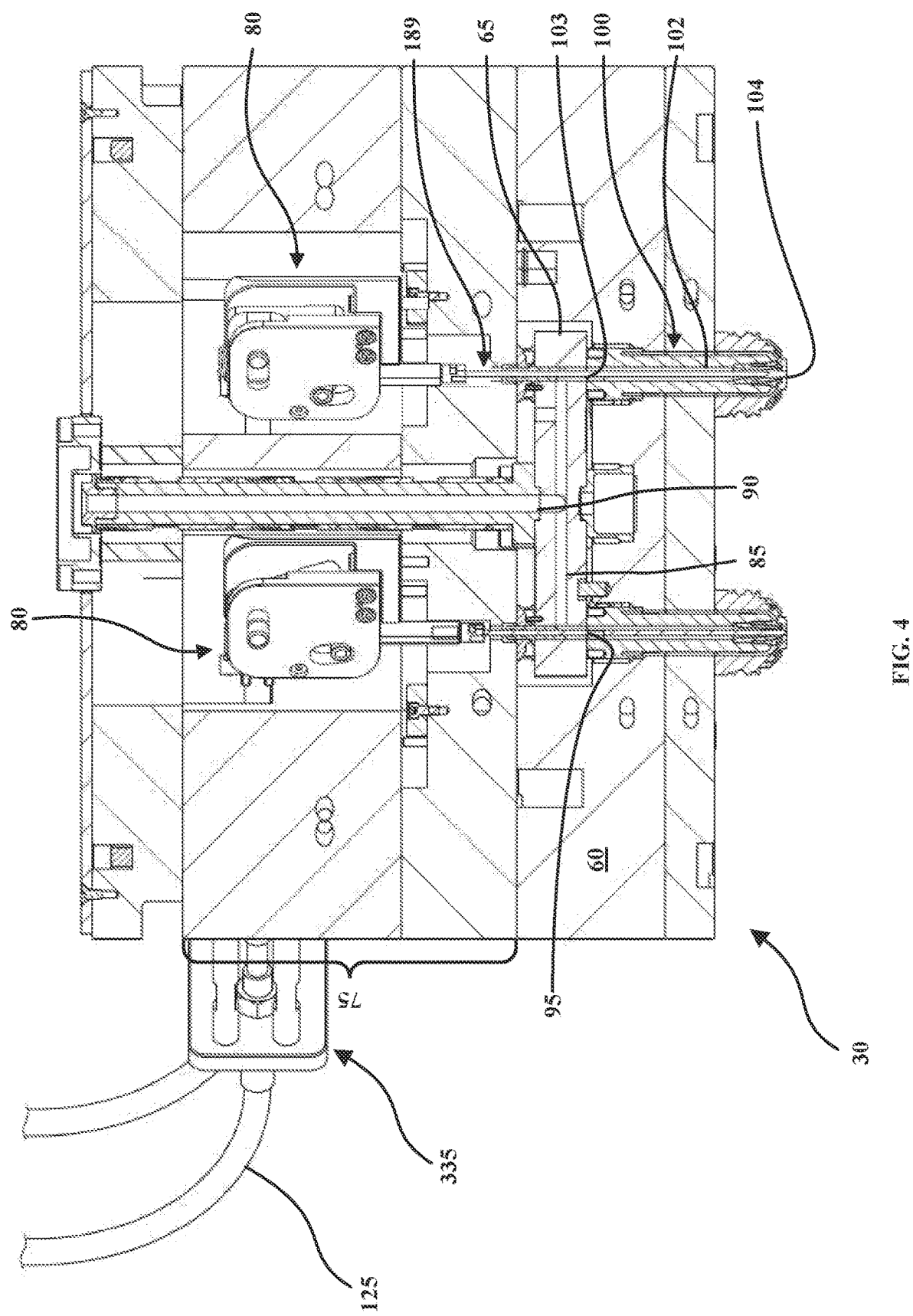
FIG. 4 is a sectional view of the mold assembly of FIG. 3 showing motion redirector assemblies connected to a motion redirector assembly plate.

Referring to FIG. 4, manifold 65 is a molten plastic delivery body, which, depending on the application of injection molding apparatus 10, can include a network of channels 85 having a manifold inlet 90 and a plurality of manifold outlets 95 (referenced, in the present application, individually as manifold outlet 95 and collectively as manifold outlets 95) for distributing molten plastic from injection unit 15 to nozzles 100 (referenced, in the present application, individually as nozzle 100 and collectively as nozzles 100). Manifold inlet 90 is in fluid communication with injection unit 15. Core plate 45 includes cores 105 (see FIG. 2 showing one core 105) (referenced, in the present application, individually as core 105 and collectively as cores 105). Cavity plate 55 includes cavities 110 (see FIG. 2 showing one cavity 110), referenced, in the present application, individually as cavity 110 and collectively as cavities 110.

In operation, clamping unit 25 closes mold assembly 30 and clamps mold assembly 30 shut, in a closed position, to prevent mold assembly 30 from opening under the pressure of molten plastic being injected, by injection unit 15, into cavities 110. With mold assembly 30 clamped in the closed position, molten plastic (not shown) is injected into space 115, shaped and dimensioned to create an article (not shown), between core 105 and corresponding cavity 110. When the article is ready to depart mold assembly 30, the article clings to core 105. To remove the article from core 105, mold assembly 30 opens allowing stripper plate 50 to move upstream to eject the article from core 105.

Molten plastic delivery system 20 includes mold assembly 30, motion redirector assemblies 80, actuators 120 (referenced, in the present application, individually as actuator 120, and collectively as actuators 120), and push-pull cables 125 (referenced, in the present application, individually as push-pull cable 125, and collectively as push-pull cables 125) (an example of push-pull cable 125 is a Bowden cable) coupling actuators 120 to respective motion redirector assemblies 80. Push-pull cable 125 includes an input end 127, for coupling with actuator 120, and an output end 129 for coupling with motion redirector assembly 80. In the illustrated embodiments, actuators 120 are linear actuators. In the illustrated embodiments, actuators 120 are located upstream of platen 345 with push-pull cables 125 fed through bores 350 in platen 345. However, a person of relevant ordinary skill in the art would appreciate that actuators 120 can be located in other suitable locations.

Figure 3:
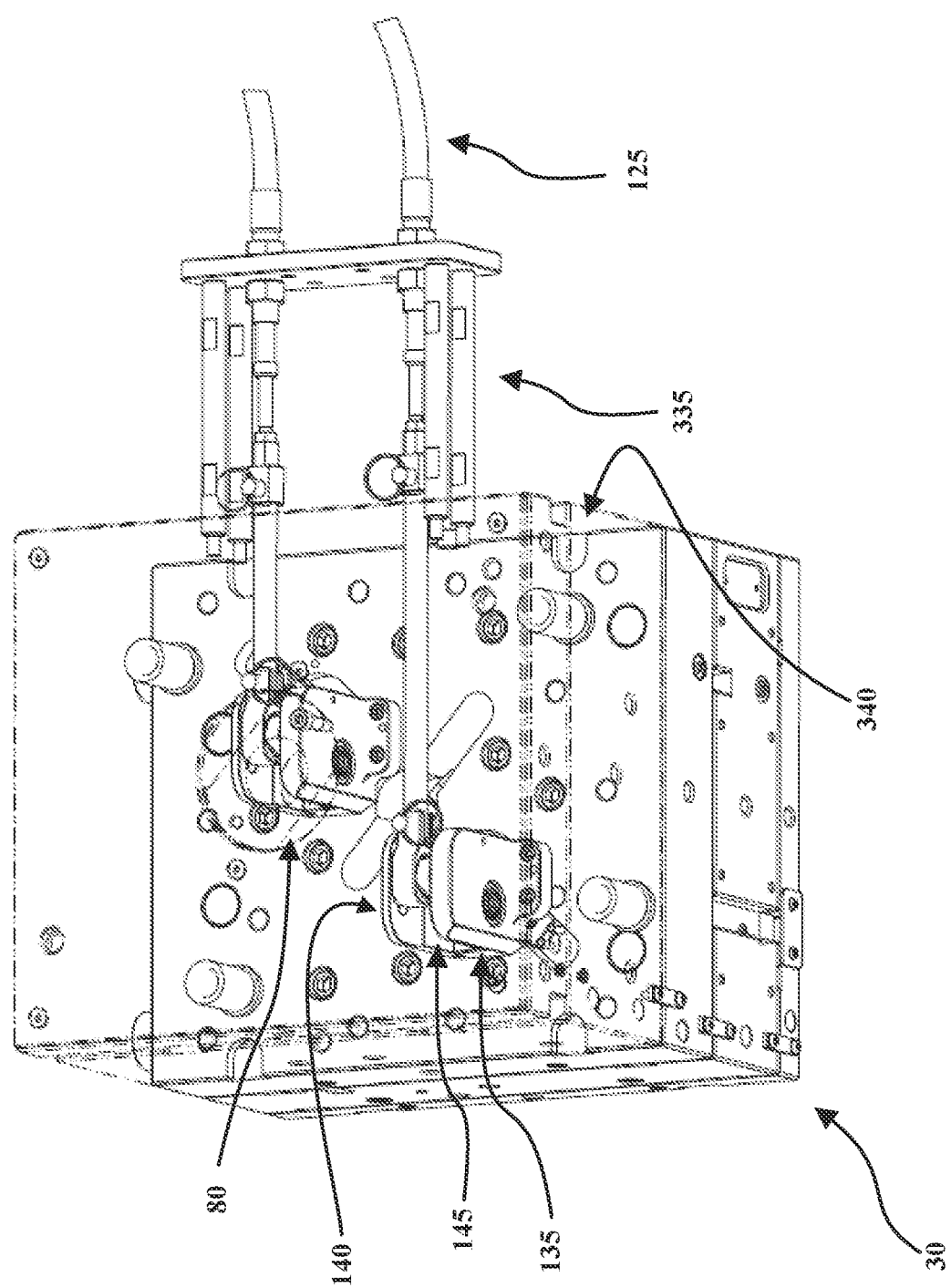
FIG. 3 is a top perspective view of a mold assembly of FIG. 2 according to an embodiment of the present application.
Figure 5:
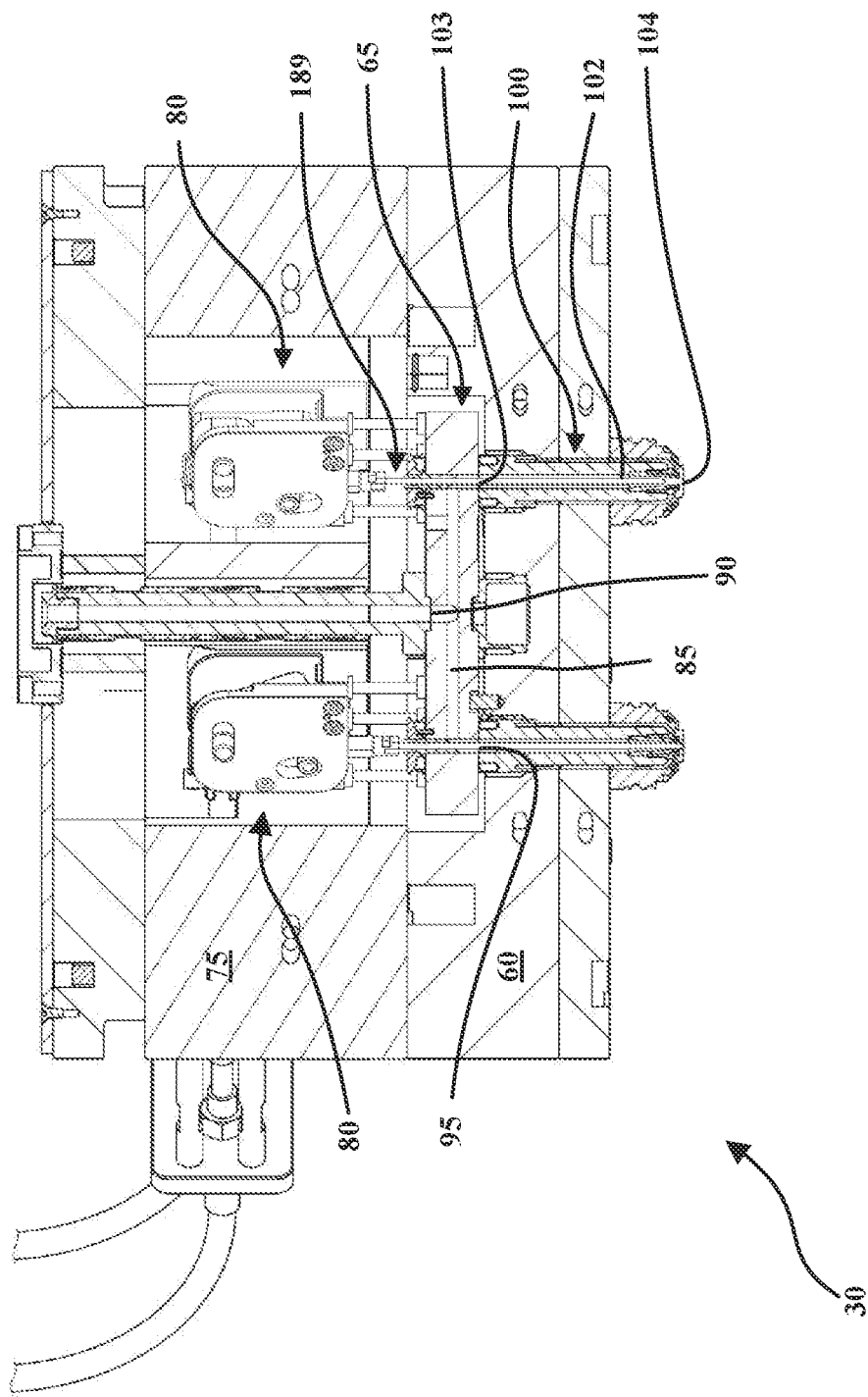
FIG. 5 is a sectional view of the mold assembly of FIG. 2 showing motion redirector assemblies connected to a manifold according to an embodiment of the present application.
Figure 7:
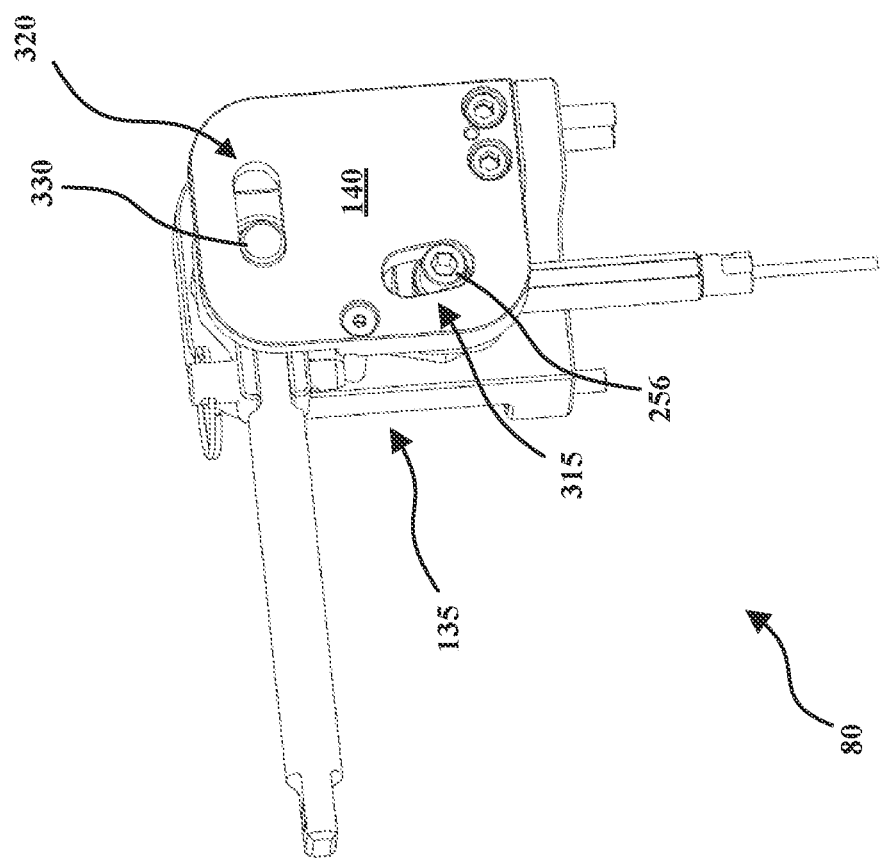
FIG. 7 is a perspective view of a motion redirector assembly of FIG. 2.
Figure 8:
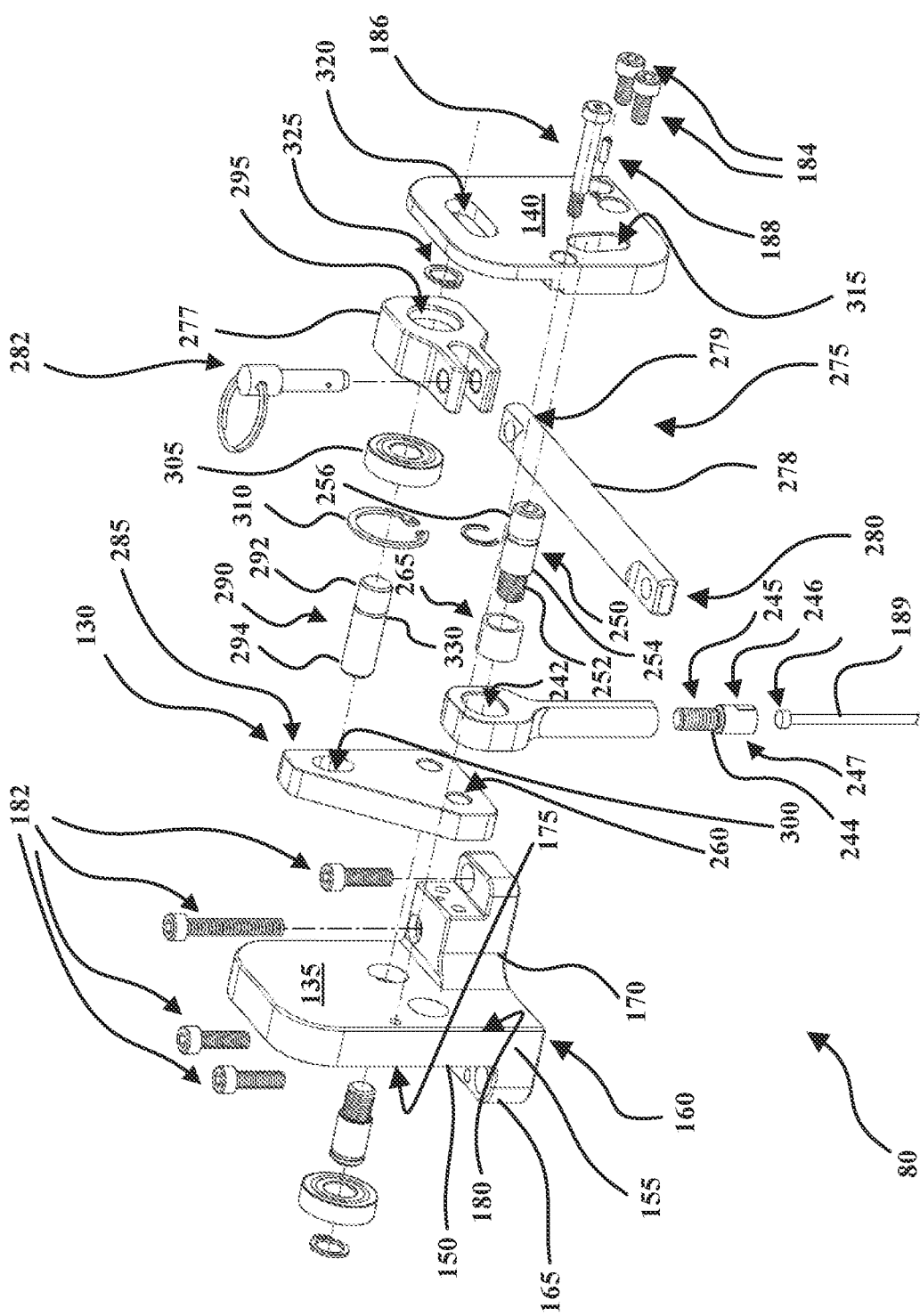
FIG. 8 is an exploded view of the motion redirector assembly of FIG. 7.
Figure 9:
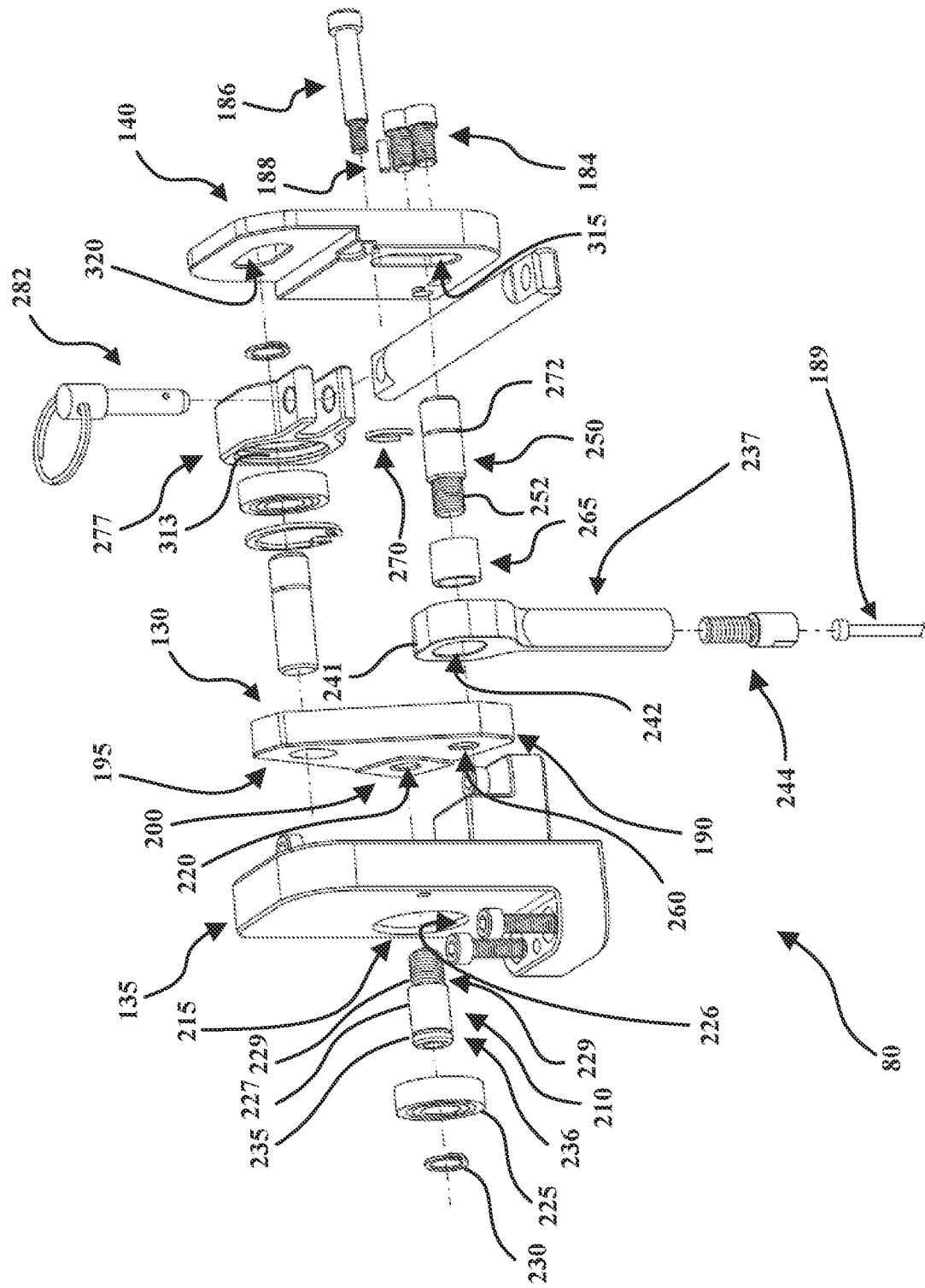
FIG. 9 is an exploded view of the motion redirector assembly of FIG. 7.

Referring to FIGS. 7, 8, and 9, motion redirector assembly 80 includes a bell crank 130 (referenced, in the present application, individually as bell crank 130, and collectively as bell cranks 130), a first and second opposing members 135, 140 defining a spacing 145 housing bell crank 130 (see FIG. 3). In the illustrated embodiments, first and second members 135, 140 are predominantly planar. First member 135 includes a body 150 having a base 155 at an end 160. Base 155 includes a first and second lobes 165, 170 on respective first and second opposing sides 175, 180 of body 150. Four fasteners 182 fastens first member 135 to motion redirector assembly plate 75 (see FIGS. 4 & 8). Two fasteners 184 fastens second member 140 to base 155. In the embodiment illustrated by FIG. 5, first member 135 is fastened to manifold 65, rather than motion redirector assembly plate 75. (In the illustrated embodiments fasteners 182, 184 are screws but person of relevant ordinary skill in the art would appreciate that other means can be used to fasten first member 135 to motion redirector plate 75, manifold 65, or second member 140, such as first member 135 can be integral with motion redirector assembly plate 75.) A first and second pegs 186, 188 are each received in both first member 135 and second member 140 to align first member 135 and second member 140 relative to each other.

Figure 10:
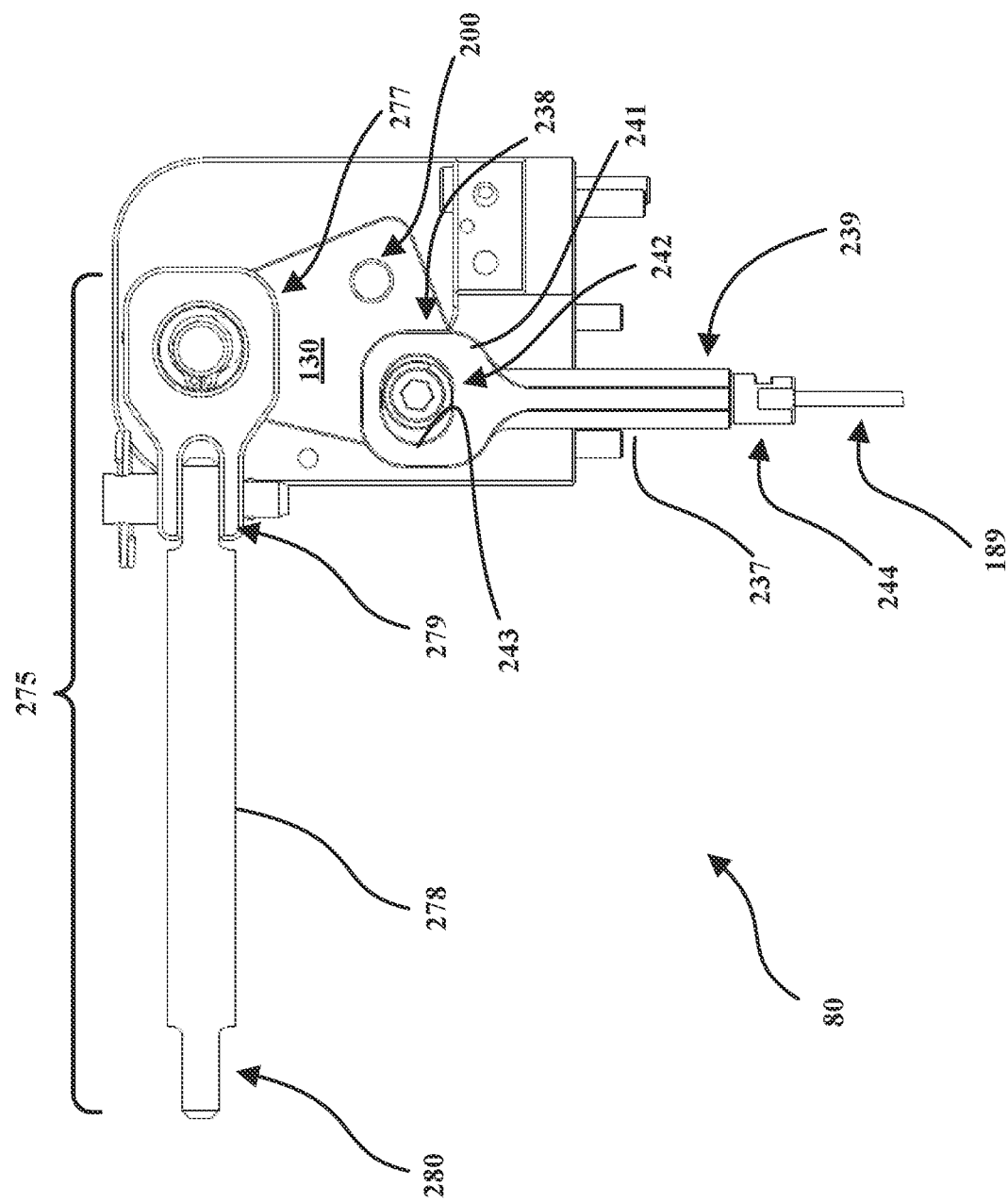
FIG. 10 is a side view of the motion redirector assembly of FIG. 7 with second member removed showing the valve pin in the closed position.
Figure 11:
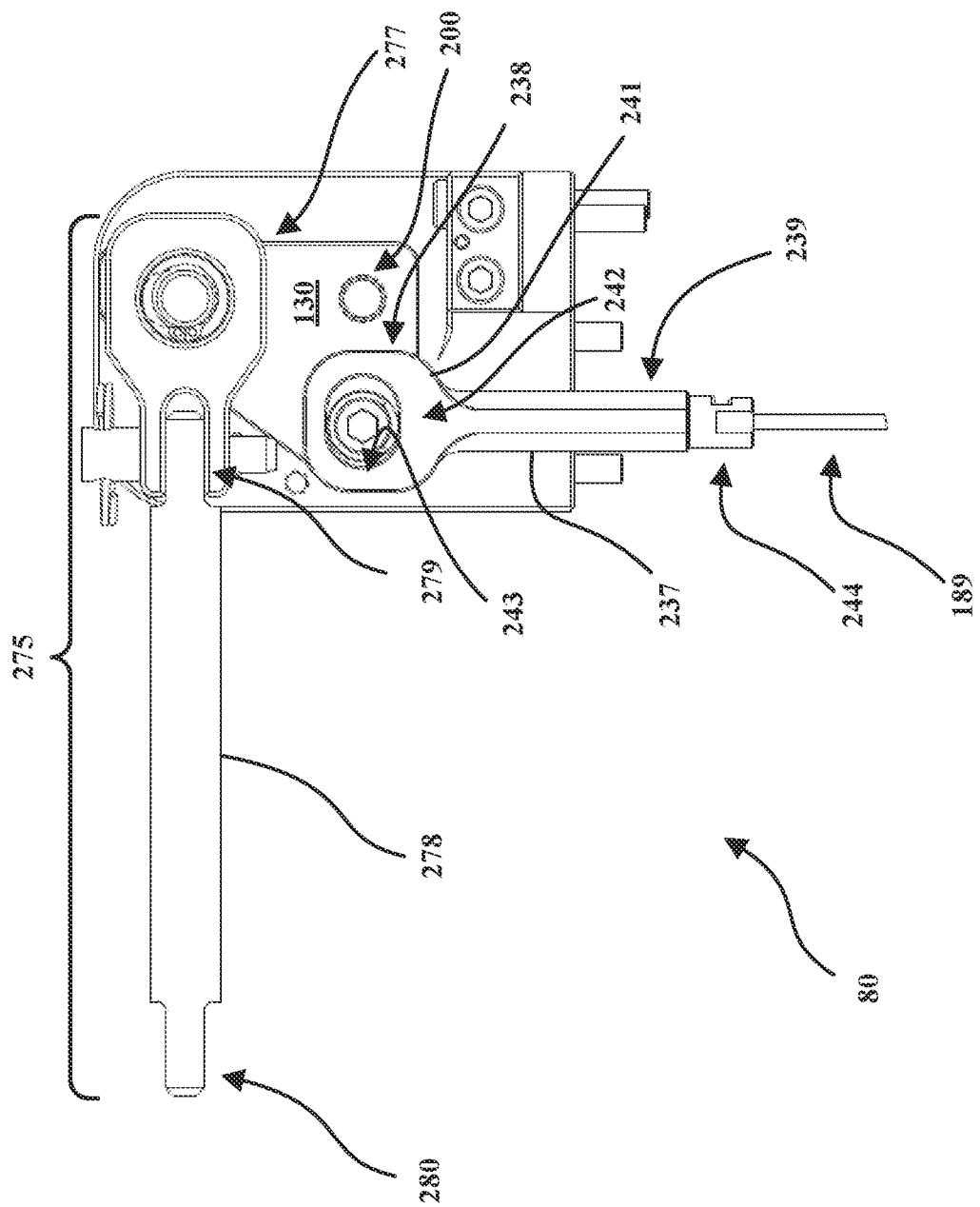
FIG. 11 is a side view of the motion redirector assembly of FIG. 7 with second member removed showing the valve pin in the open position.

Referring to FIG. 4, molten plastic delivery system 20 includes nozzles 100 and a plurality of valve pins 189 (referenced, in the present application, individually as valve pin 189, and collectively as valve pins 189) received in a nozzle channel 102 of nozzle 100 and reciprocable within nozzle channel 102 between a closed position to prevent the molten plastic from passing through the downstream nozzle channel opening (see FIG. 10 and the valve pin on the left side nozzle of FIG. 4) and an open position to allow the molten plastic to pass through the downstream nozzle channel opening (see FIG. 11 and the valve pin on the right side nozzle of FIG. 4). Nozzle channel 102 includes an upstream nozzle channel opening 103 and a downstream nozzle channel opening 104. Upstream nozzle channel opening 103 is in fluid communication with manifold outlet 95.

Referring to FIGS. 8 and 9, bell crank 130 includes a first and second arms 190, 195 connected at and rotatable about a pivot 200, first arm 190 is coupled to valve pin 189 and second arm 195 is coupled to push-pull cable 125. In the illustrated embodiment, bell crank 130 is predominantly triangularly shaped with arms 190, 195 forming respective legs of the triangle and pivot 200 is located at an apex opposite the base of the triangle. The legs and the base forming the three sides of the triangle. A person of ordinary relevant ordinary skill in the art would appreciate that bell crank 130 can be in other forms and shapes such as two elongated arms joined at a pivot.

Bell crank 130 is rotatably coupled to first member 135 at pivot 200 via a first pin 210 received in a first bore 215 of first member 135 and a second bore 220 on bell crank 130 (see FIG. 9). A first radial bearing 225 is positioned in between first pin 210 and an inner wall 226 of first bore 215 to support the radial load experienced by first pin 210 inside first bore 215. First pin 210 includes a first end portion 227 and second end portion 229 having a reduced diameter compared to that of first end portion 227. In the illustrated embodiment, first radial bearing 225 is positioned in between first end portion 227 and inner wall 226 of first bore 215. Second end portion 229 is received in second bore 220. A first retaining ring 230 is installed on a groove 235 at an end 236 of first end portion 227. First radial bearing 225 is retained in first bore 215 by first retaining ring 230 and bell crank 130. In the illustrated embodiment, first pin 210 is threaded to second bore 220. A person of relevant ordinary skill in the art would appreciate that first pin 210 can be fixed to bell crank by other means, such as having first pin 210 being integral with bell crank 130 and first end portion 227 being a protrusion from bell crank 130 received in first bore 215.

Motion redirector assembly 80 includes a valve pin coupler 237 coupling valve pin 189 to bell crank 130. Valve pin coupler 237 includes a first and second ends 238, 239, a head 241, at first end 238, defining a bore 242 having an inner wall 243 (see FIG. 10). Second end 239 is coupled to valve pin 189 via a connector 244. In the illustrated embodiment, connector 244 is threadably fastened to valve pin coupler 237 at a first end portion 245 and includes a T-slot 246 at a second end portion 247 housing valve pin head 246 (see FIG. 8). Valve pin coupler 237 is rotatably coupled to bell crank 130 via a second pin 250 having a first end portion 252, a mid portion 254, and second end portion 256. First end portion 252 is threadably fastened to bore 260 on bell crank 130 and mid portion 254 is housed in bore 242 with a second radial bearing 265 positioned in between mid portion 254 and inner wall 243 of bore 242 to absorb the radial load experienced by second pin 250 inside bore 242 of head 241. Second radial bearing 265 is retained in bore 242 by a third retaining ring 270 installed on a groove 272 of pin second pin 250 (see FIG. 9). Bore 242 has a rounded rectangular cross-section allowing second pin 250 to be radially slidable in bore 242 and head 241 rotatable around second pin 250.

Figure 6:
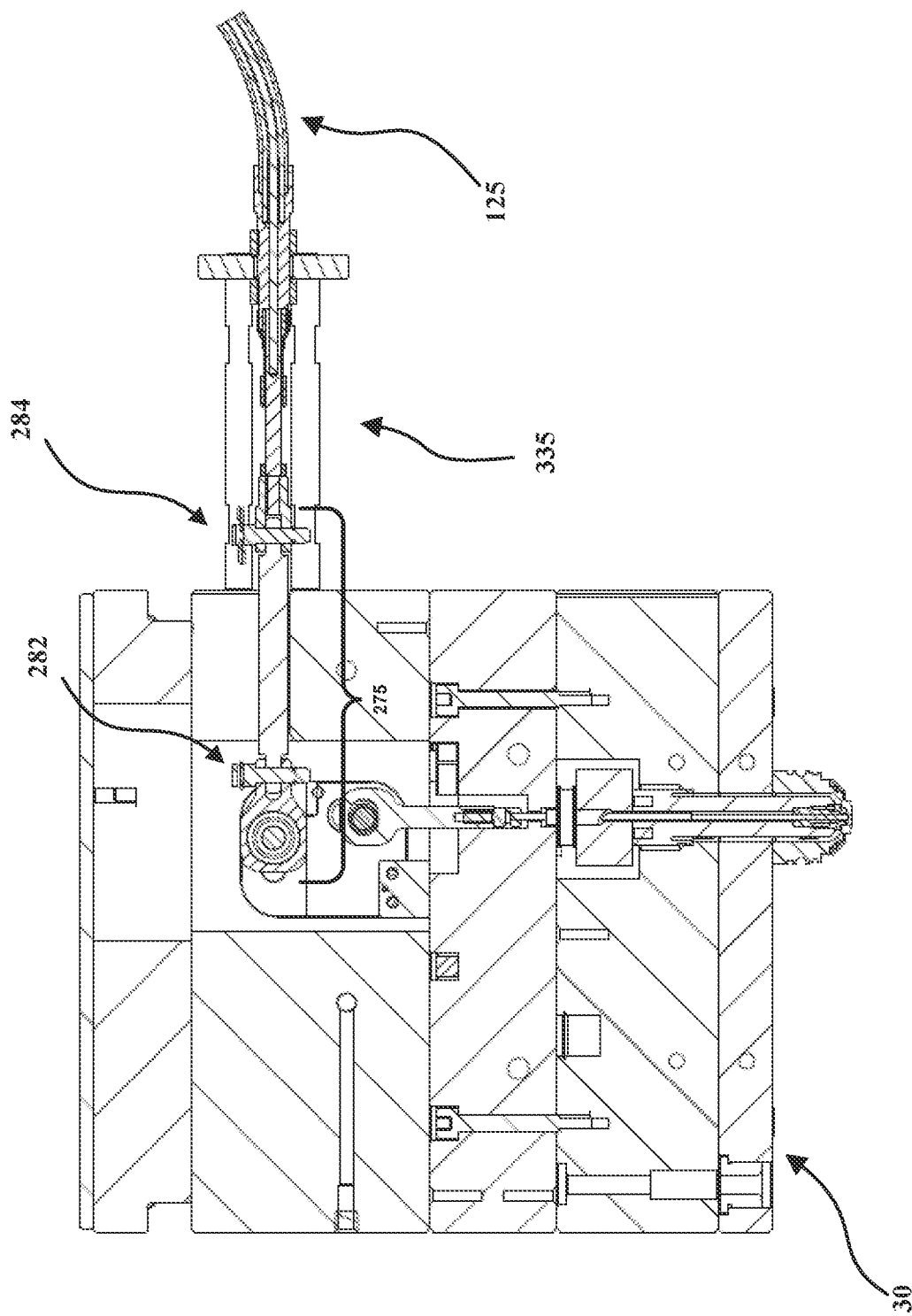
FIG. 6 is a sectional view of the mold assembly of FIG. 3 showing a motion redirector assembly with the first member of the motion redirector assembly removed.

Referring to FIGS. 8 and 9, Motion redirector assembly 80 includes a push-pull cable coupler 275 comprising a head 277 and an extender 278 including a first end 279 and second end 280. First end 279 is releasably connected to head 277 and second end 280 is releasably connected to push-pull cable 125. Motion redirector assembly 80 includes a first detent pin 282, releasably connecting head 277 to extender 278, and a second detent pin 284 releasably connecting extender to output end 129 of push-pull cable 125 (see FIG. 6). Push-pull cable coupler 275 is rotatably coupled to bell crank 130 at an end 285 of second arm 195 via a third pin 290, having a first and second end portions 292, 294, second end portion 294 housed in a sixth bore 300 on bell crank 130. In the illustrated embodiments, a fifth bore 295 is defined by head 277 and sixth bore 300 is defined by second arm 195. A third radial bearing 305 is positioned in between third pin 290 and fifth bore 295 to absorb the radial load experienced by third pin 290 inside fifth bore 295 and to reduce the friction between second end portion 294 and sixth bore 300. Third radial bearing 305 is retained in fifth bore 295 by a snap ring 310 installed in a groove 313 on bore 295 (see FIG. 9).

Second member 140 includes a first slot 315 and a second slot 320. Second end portion 256 of second pin 250 is received in and radially translatable within first slot 315 (see FIG. 8). First slot 315 is oriented to guide the movement of second pin 250 as first arm 190 moves via the rotation of bell crank 130 effected by push-pull cable 125 acting on second arm 195. First end portion 292 of third pin 290 is received in and radially translatable within second slot 320. A retaining ring 325 is installed on a groove 330 of third pin 290 to retain first end portion 292 in second slot 320 (see FIG. 8). Second slot 320 is oriented to guide the movement of third pin 290 as second arm 195 moves via the rotation of bell crank 130 effected by push-pull cable 125 acting on second arm 195.

Referring to FIGS. 2 and 3, molten plastic delivery system 20 includes brackets 335 (referenced, in the present application, individually as bracket 335 and collectively as brackets 335) mounted to an exterior surface 340 of motion redirector assembly plate 75. Bracket 335 supports output end 129 coupled to second end 280 of push-pull cable coupler 275.

In the illustrated embodiments, motion redirector assembly 80 is configured to move valve pin 189 into the open position by angularly pushing second arm 195 of bell crank 130 (see FIG. 11 and the valve pin on the right hand side of FIG. 4) to rotate about pivot 200 (i.e., in clockwise direction in FIG. 11) and into the close position by angularly pulling second arm 195 of bell crank 130 (see FIG. 10 and the valve pin the left hand side of FIG. 4) to rotate about pivot 200 (i.e., in counter-clockwise direction in FIG. 11). The ends of valve pin coupler 237 and push-cable coupler 275 that are pointing away from their corresponding connection to bell crank 130 are both pointing in substantially the same angular direction about pivot 200. In the illustrated embodiment, both second end 280 of extender 278 and second end 239 of valve pin coupler 237 are pointing in a counterclockwise direction, but a person of relevant ordinary skill in the art would appreciate that, depending on the orientation of the components, both second end 280 of extender 278 and second end 239 of valve pin coupler 237 can point in a clockwise direction. To push second arm 195 of bell crank 130, actuator 120 exerts a force, in the direction from input end 127 to output end 129, onto push-pull cable 125. To pull second arm 195 of bell crank 130, actuator 120 exerts a force, in the direction from output end 129 to input end 127, onto push-pull cable 125.

Figure 12:
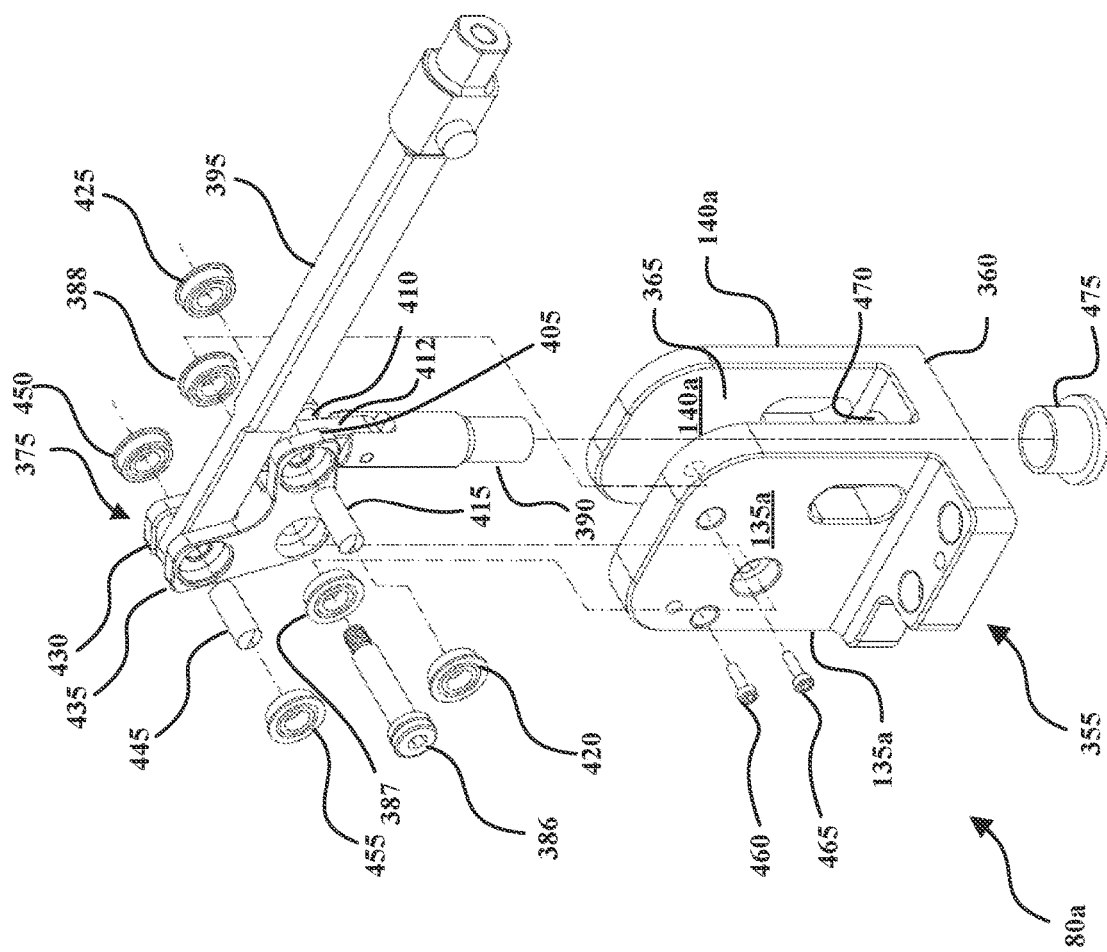
FIG. 12 is an exploded top perspective view of the motion redirector assembly according to another embodiment of the present application.
Figure 13:
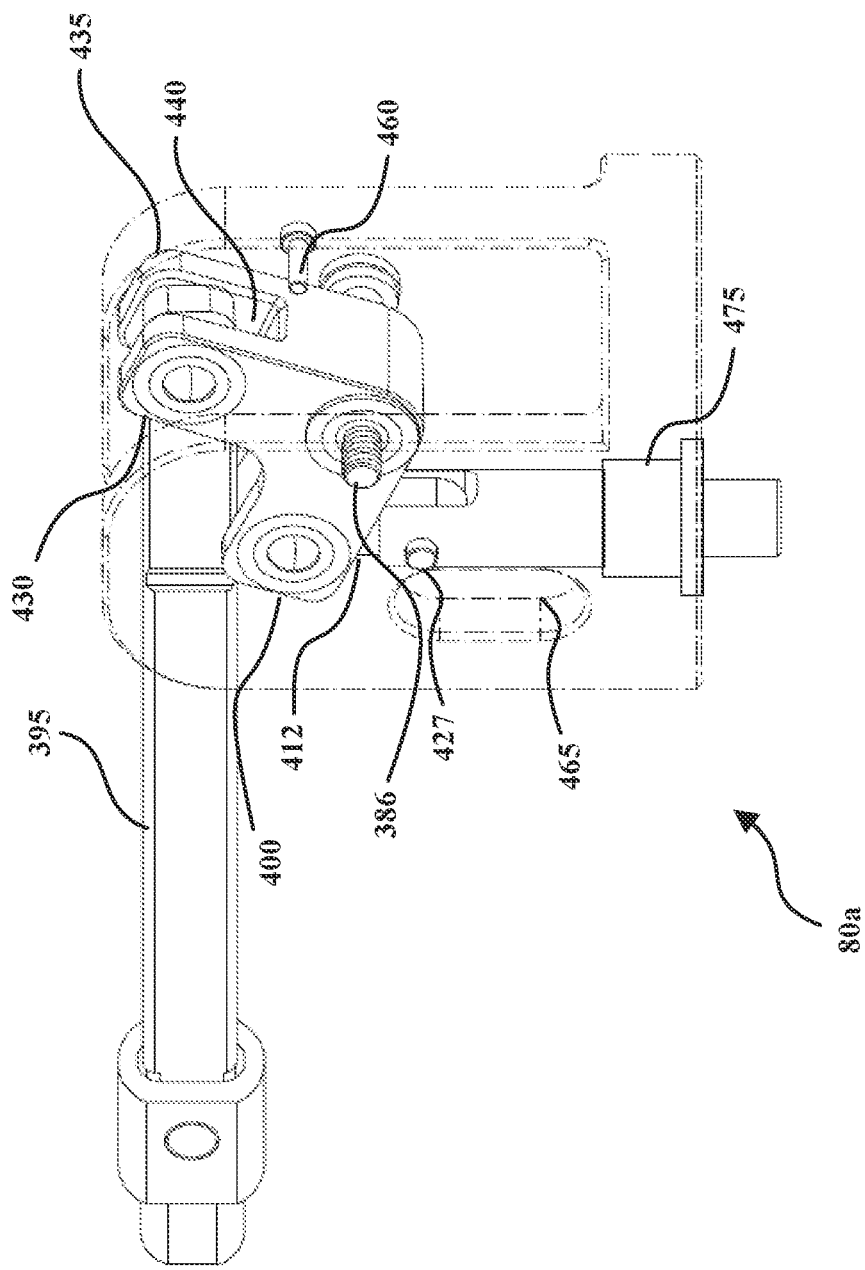
FIG. 13 is a perspective view of the motion redirector assembly of FIG. 12.

FIG. 12 is an exploded top perspective view of motion redirector assembly 80, according to another embodiment of the present application, generally indicated as 80a. All features of motion redirector assembly 80a that are identical to the features of motion redirector assembly 80 will share the same respective reference number except post-fixed with an "a". Motion redirector assembly 80a differs from motion redirector assembly 80 in that whereas first member 135 and second member 140 of motion redirector assembly 80 are interconnected discrete members, these members are implemented as a unitary body 355 comprising first member 135a, second member 140a, and a base 360 joining first member 135a and second member 140a. First member 135a and second member 140a project from base 360 defining a spacing 365 between first member 135a and second member 140a. Motion redirector assembly 80a comprises a bell crank 375 which includes a first arm 380 and a second arm 385 connected at and rotatable about pivot 200a (see FIG. 14 which is a side view of motion redirector assembly 80a with body 355 in phantom). Bell crank 375 is positioned in spacing 365 and connected to body 355 via a screw 386, which, in the illustrated embodiments, is a shoulder screw. Radial bearings 387, 388 are positioned between screw 386 and bell crank 375. Radial bearings 387, 388 are at least partially embedded in bell crank 375. Bell crank 375 can be pivoted about screw 386. In the illustrated embodiments, screw 386 is threaded into second member 140a (see FIG. 13 which is a perspective view of motion redirector assembly 80a with body 355 in phantom).

Figure 15:
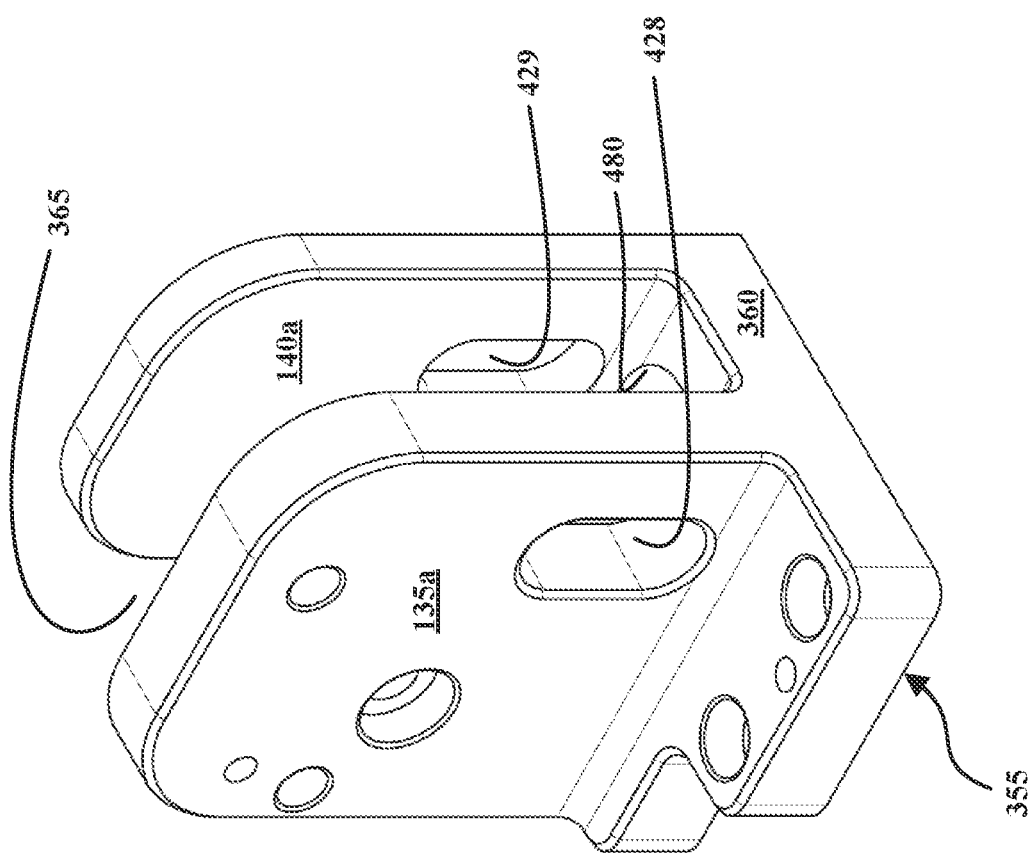
FIG. 15 is a top perspective view of the body of the motion redirector assembly of FIG. 12.

Motion redirector assembly 80a comprises a valve pin coupler 390 and a push-pull cable coupler 395. First arm 380 includes a member 400 and a member 405 opposite member 400 separated by a spacing 410 (see FIG. 12 and FIG. 13). First arm 380 is coupled to valve pin coupler 390. In the illustrated embodiments, motion redirector assembly 80a includes a linking member 412 coupling valve pin coupler 390 to first arm 380. Linking member 412 is partially received in spacing 410 and is connected to first arm 380 via a dowel 415 press-fitted in radial bearings 420, 425 and radial bearings 420, 425 are at least partially embedded in members 405, 400, respectively. Linking member 412 is connected to valve pin coupler 390 via a dowel 427 press-fitted in valve pin coupler 390. First member 135a defines a bore 428 and second member 140a defines a bore 429 (see FIG. 15 which is a top perspective view of body 355 of motion redirector assembly 80a). Bores 428, 429 are through bores that permit access to dowel 427 from either side of first member 135a or second member 140a. This can facilitate disconnecting linking member 412 from valve pin coupler 390 by inserting a tool (not shown) through either of bores 428, 429 to displace dowel 427 from valve pin coupler 390 thereby freeing valve pin coupler 390 from linking member 412. Second arm 385 includes a member 430 and a member 435 opposite member 430 separated by a spacing 440. Push-pull cable coupler 395 is partially received in spacing 440. In the illustrated embodiments, second arm 385 is coupled to push-pull cable coupler 395 via a dowel 445 press-fitted in radial bearings 450, 455 and radial bearings 450, 455 are at least partially embedded in members 430, 435, respectively.

Figure 14:
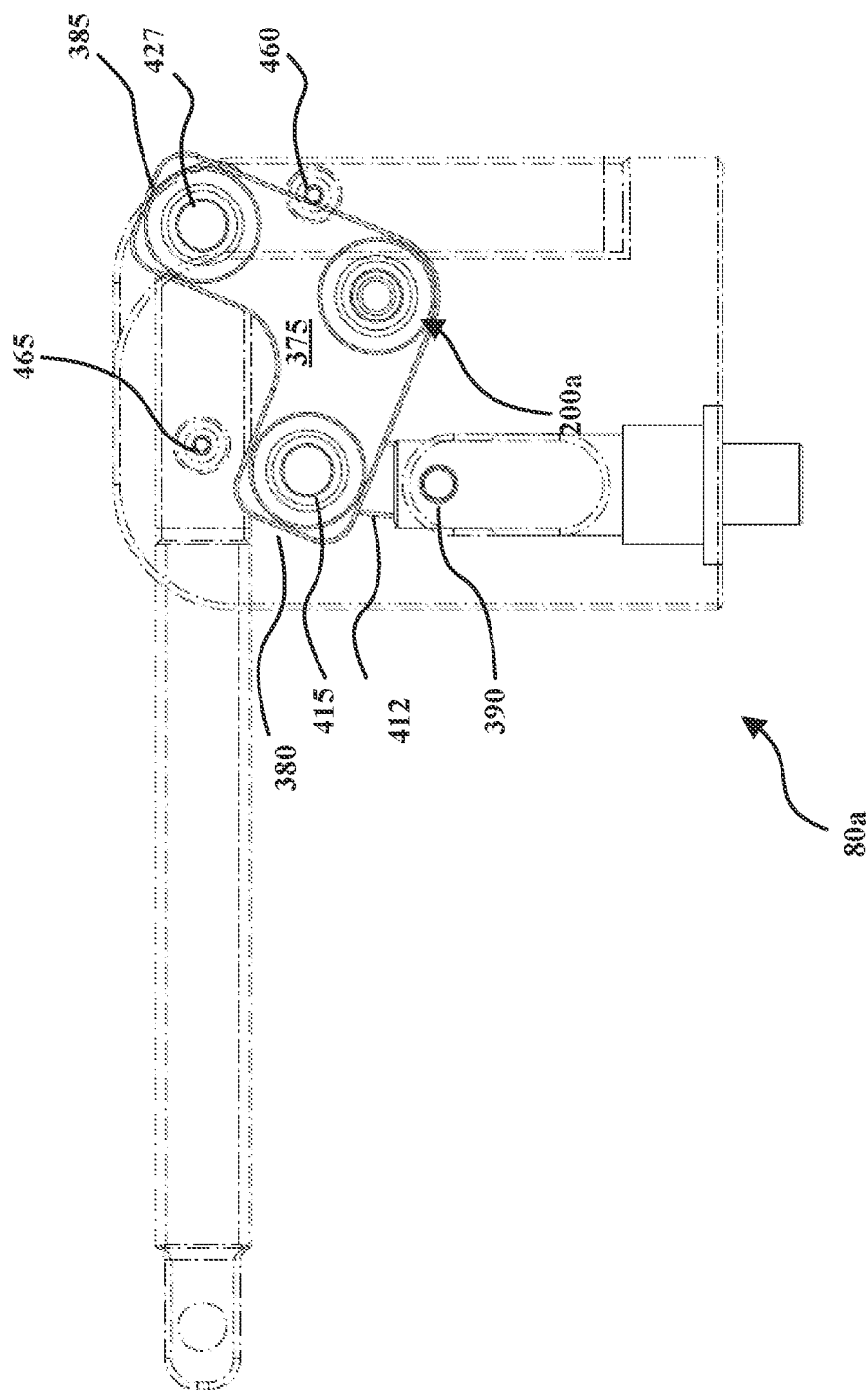
FIG. 14 is a side view the motion redirector assembly of FIG. 12.

Motion redirector assembly 80a includes a pin 460 and a pin 465 to limit the angular movement of the bell crank about pivot 200a between pin 460 and ping 465 (see FIG. 14). Bell crank 375 cannot be pushed via push-pull cable coupler 395 beyond pin 460 and cannot be pulled beyond pin 465. Pins 460, 465 extend through first member 135a and limit the angular movement of second arm 385 about pivot 200a but do not come in physical contact with push-pull cable coupler 395.

Base 360 defines a bore 470, which is a through bore, through which valve pin coupler 390 extends (see FIG. 12). Motion redirector assembly 80a includes a bushing 475 received in bore 470. Bushing 475 is positioned between valve pin coupler 375 and an inner surface 480 of bore 470.

While various embodiments according to the present application have been described above, it should be understood that they have been presented by way of illustration and example only, and not limitation. It will be apparent to persons of relevant ordinary skill in the relevant art that various changes in form and detail can be made therein without departing from the scope of the application. It will also be understood that each feature of each embodiment discussed herein, may be used in combination with the features of any other embodiment. Thus, the breadth and scope of the present application should not be limited by the above-described exemplary embodiments, but should be defined only in accordance with the appended claims and their equivalents.

What is claimed is:
1. A molten plastic delivery system comprising:
   a plurality of plates;
   a manifold defining a network of channels for conveying a molten plastic from a manifold inlet to a manifold outlet, the manifold housed in the plurality of plates;
   a nozzle defining a nozzle channel having an upstream nozzle channel opening and a downstream nozzle channel opening, the upstream nozzle channel opening in fluid communication with the manifold outlet;

a valve pin received in the nozzle channel and reciprocable within the nozzle channel between a closed position to prevent the molten plastic from passing through the downstream nozzle channel opening and an open position to allow the molten plastic to pass through the downstream nozzle channel opening;

a bell crank having a first arm and a second arm connected at and rotatable about a pivot, the first arm coupled to the valve pin; and a push-pull cable coupled to the second arm such that angularly pushing the second arm about the pivot via the push-pull cable moves the valve pin to the open position and angularly pulling the second arm about the pivot via the push-pull cable moves the valve pin to the closed position.

2. The molten plastic delivery system of claim 1 further comprising:

a push-pull cable coupler including a first end and a second end; and a valve pin coupler including a third end and a fourth end, wherein the push-pull cable includes an output end, wherein the first end of the push-pull cable coupler is coupled to the second arm of the bell crank, and the second end of the push-pull cable coupler is coupled to the output end of the push-pull cable, and wherein the third end of the valve pin coupler is coupled to the first arm of the bell crank, the fourth end of the valve pin coupler is coupled to the valve pin, and both the second end of the push-pull cable coupler and the fourth end of the valve pin coupler point in substantially the same angular direction about the pivot.

3. The molten plastic delivery system of claim 2, wherein the plurality of plates include a motion redirector assembly plate positioned upstream of the manifold, the molten plastic delivery system further comprising a motion redirector assembly having a first member and a second member and the bell crank housed in a spacing between the first and second members, the bell crank coupled to the first member at the pivot.

4. The molten plastic delivery system of claim 3, wherein the motion redirector assembly includes a pin coupling the push-pull cable coupler to the second arm, the pin having a first end portion and a second end portion, wherein the push-pull cable coupler includes an extender and a head at the first end of the push-pull cable coupler, the extender releasably connecting the head to the output end of the push-pull cable, the head defining a bore housing the first end portion, and the second arm defining a bore housing the second end portion.

5. The molten plastic delivery system of claim 4, wherein the motion redirector assembly includes an another pin, the second member includes a first slot and a second slot, the first slot to linearly guide the another pin coupling the valve pin to the first arm, the second slot to linearly guide the pin coupling the push-pull cable to the second arm.

6. The molten plastic delivery system of claim 5, wherein the valve pin coupler defines a bore having a rounded rectangle cross-section housing the another pin, the another pin radially slidable within the bore of the valve pin coupler and the valve pin coupler rotatable around the another pin.

7. The molten plastic delivery system of claim 6, further comprising a bracket mounted to an exterior surface of the motion redirector assembly plate, the bracket supporting the output end coupled to the second end of the push-pull cable coupler.

8. The molten plastic delivery system of claim 3, wherein the first member and the second member form a unitary body.

9. The molten plastic delivery system of claim 8, wherein the motion redirector assembly includes a base from which the first member and the second member project.

10. The molten plastic delivery system of claim 9, wherein the base defines a bore, the bore is a through bore, through which the valve pin coupler extends.

11. The molten plastic delivery system of claim 10, wherein the motion redirector assembly further includes a bushing received in the through bore and positioned between an inner surface of the through bore and the valve pin coupler.

12. The molten plastic delivery system of claim 11, wherein the motion redirector assembly further includes a linking member coupling the third end to the first arm.

13. The molten plastic delivery system of claim 12, wherein the motion redirector assembly further includes a dowel coupling the linking member to the first arm.

14. The molten plastic delivery system of claim 13, wherein the motion redirector assembly further includes an another dowel coupling the first end to the second arm.

15. The molten plastic delivery system of claim 14, wherein the motion redirector assembly further includes a first pin and a second pin positioned to limit the angular movement about the pivot of the bell crank between the first pin and the second pin.

* * * * *